N. P. LINN.
COOKING UTENSIL.
APPLICATION FILED FEB. 20, 1922.

1,436,318.

Patented Nov. 21, 1922.

INVENTOR
NELSON P. LINN

By Paul & Paul
ATTORNEYS

Patented Nov. 21, 1922.

1,436,318

UNITED STATES PATENT OFFICE.

NELSON P. LINN, OF MINNEAPOLIS, MINNESOTA.

COOKING UTENSIL.

Application filed February 20, 1922. Serial No. 537,843.

*To all whom it may concern:*

Be it known that I, NELSON P. LINN, a citizen of the United States, resident of Minneapolis, county of Hennepin, and State of Minnesota, have invented certain new and useful Improvements in Cooking Utensils, of which the following is a specification.

This invention relates to new and useful improvements in cooking utensils and, while adapted for heating purposes in the same manner as the lid of an ordinary cooking range, it is particularly adapted for cooking directly upon the lid or griddle such, for example, as the so-called wheat-cakes or pan cakes. This novel device is adapted particularly for use in connection with a heating means such as a gas or oil stove. Ordinarily in the employment of such a heating means, the central portion of the griddle is heated greatly in excess of the outer portions thereof and such central portion constitutes the only available cooking area. This novel device assures the uniform heating of the cooking surface of the griddle. Broadly, the device consists of a bottomless body member or holder adapted to be positioned over the heating means. The holder carries a griddle in spaced relation above a deflector which functions outwardly to spread the flame or hot air and gases to assure uniform heating of the griddle.

The object therefore of the invention is to provide an improved cooking utensil.

Other objects of the invention will more fully appear from the following description and the accompanying drawings and will be pointed out in annexed claims.

In the accompanying drawings there has been disclosed a structure designed to carry out the objects of the invention, but it is to be understood that the invention is not confined to the exact features shown, as various changes may be made within the scope of the claims which follow.

Figure 1:
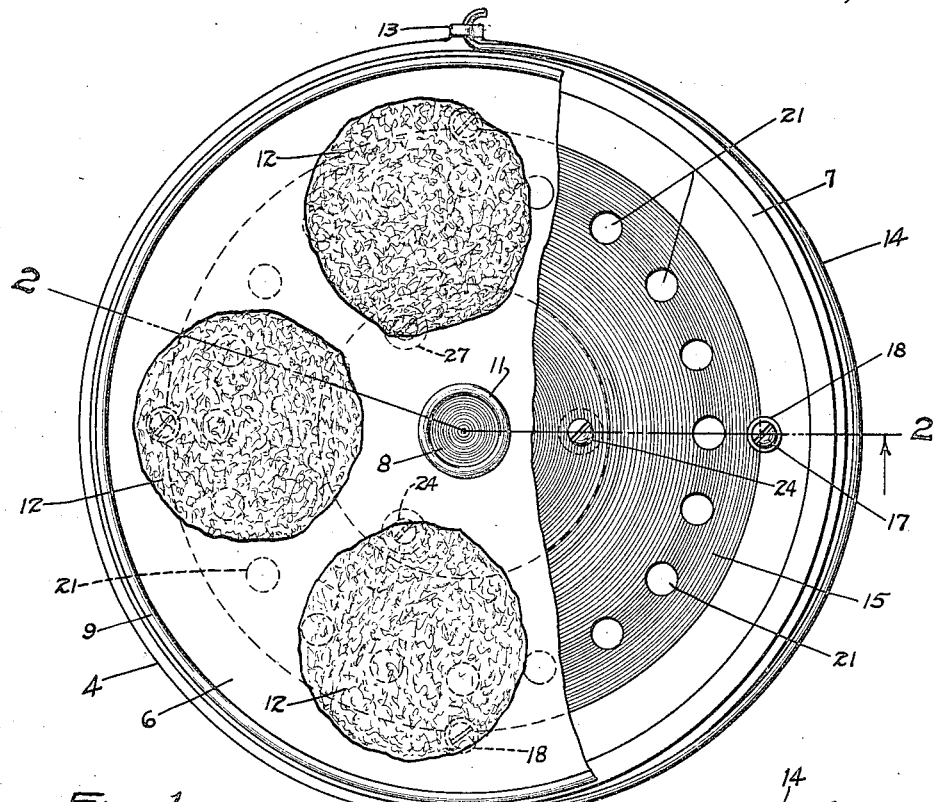
Figure 1 is a plan view of the assembled cooking utensil with part of the griddle broken away to show the deflector.
Figure 2:
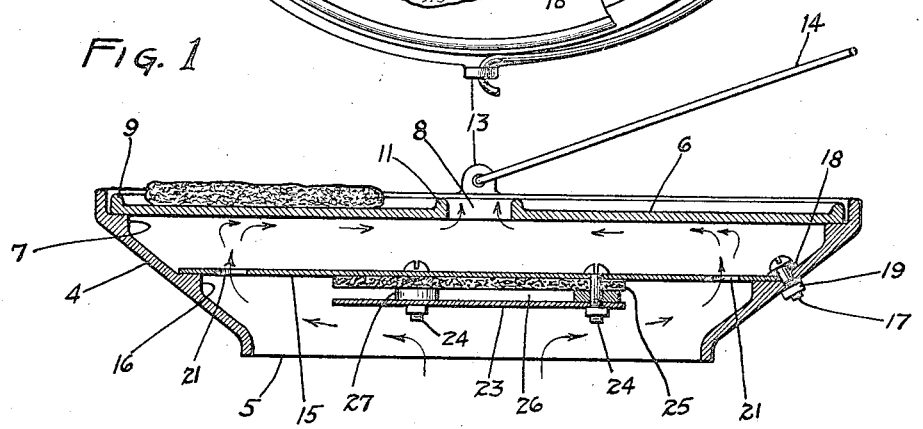
Figure 2 is a vertical section on the line 2—2 of Figure 1.

The selected embodiment of the invention here disclosed for purposes of explanation comprises a body member or holder 4 preferably of a form circular in cross-section and having its annular sides or wall downwardly and inwardly inclined toward its bottom or lower opening 5. A griddle 6 is adapted to be supported by the holder adjacent or at its upper portion and, as the holder here shown is circular in cross-section, the griddle is disk-like in form. The supporting means for the griddle is conveniently afforded by the annular shoulder 7 inwardly projecting from the inner face of the holder and upwardly presenting an annular seat for the griddle. As the holder is preferably metallic, such shoulder may be integrally cast. While such projecting shoulder is preferably provided, it is obvious that the shoulder may be dispensed with and the griddle marginal portions may simply rest upon the inclined annular wall of the holder. The griddle is formed with a substantially central opening 8 and is also desirably provided with an upwardly projecting marginal flange 9 and a similar flange 11 around the opening 8. These flanges serve to prevent the greasing material from dropping or flowing to the interior of the holder and igniting or creating smoke. Except for the central opening 8, the griddle is imperforate and upwardly presents the annular cooking surface upon which a plurality of so-called wheat-cakes or pan-cakes 12 are shown in Figures 1 and 2. For convenience in handling, the holder is provided with two integrally cast diametrically opposed eyes 13 engaged by a bail 14.

A deflector 15 is carried by the holder below and in spaced relation to the griddle. The deflector is preferably formed of a piece of relatively thin sheet metal. In this preferred type of utensil, the deflector is also circular and hence may also be directly supported by the annular inclined walls of the holder. Furthermore, being of less diameter than the griddle, the deflector may be so supported by the holder below and in spaced relation to the griddle. However, supporting means are provided for the deflector and, as here shown, comprise an annular shoulder 16, integrally cast and inwardly projecting from the inner face of the holder upwardly to present a seat for the edge of the deflector. As shown in Figures 1 and 2, a stove-bolt 17 is passed through a hole in the holder wall and the bolt-head clamps a washer 18 against the edge of the deflector while tightening of the nut 19 on the bolt functions to hold the deflector in demountably fixed assembled position. Three such clamping bolts are sufficient for the purpose.

The metallic deflector 15 is preferably formed with an imperforate major portion and with a plurality of apertures 21 annularly spaced adjacent the margin of the deflector. Thus, when the assembled holder is in cooking position, the flame or hot air and other heated gases arising from the heating means are outwardly spread by the imperforate portion of the deflector to the marginal apertures 21, thence passing upwardly through these apertures are compelled to pass beneath the griddle to its central opening 8 through which they may be discharged whereby the griddle is uniformly heated.

Figure 3:
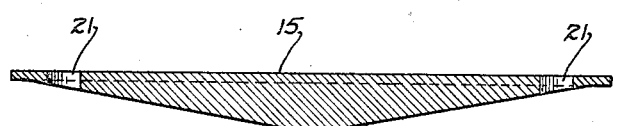
Figure 3 is a median vertical sectional view of a modified form of deflector.

Preferably, the deflector is shaped or formed on its under side to aid in the outward spread of the air or gases. This may either be effected by the conical under surface 22 of the modified form of deflector shown in Figure 3 or by the building-up of the under side as is shown in Figure 2. In both cases the central imperforate portion of the deflector is protected against burning by the direct action of the heating means.

In the preferred form shown in Figure 2, a protector disk 23 is supported by the deflector in spaced depending relation thereto. The disk 23 is preferably of sheet metal and supported by the bolts and nuts 24 carried by the deflector. When employing relatively this sheet metal it is desirable to interpose a piece of material 25 such as asbestos between the deflector 16 and the protector disk 23. Not only does the asbestos function as thermal insulation but also the air space 26 provided by the spacing washers 27 so functions. Thus not only is the central imperforate portion of the deflector protected but the spread of the gases is aided. Furthermore, the inclined wall of the holder aids in outwardly and upwardly directing the gases.

Thus by the employment of this novel cooking utensil, the effective heated area of a given griddle surface is greatly increased while such area is uniformly heated by the efficient heat distribution. Particularly is this true when comparing the performances of the usual griddle or skillet and of this novel utensil over heating means such as oil stoves or gas stoves.

I claim as my invention:

1. In a cooking utensil, the combination of a griddle holder open at its lower portion and adapted to be positioned over a heating means, said holder having its sides downwardly and inwardly inclined, a deflector adapted to be supported by the holder sides adjacent the lower portion thereof and having an imperforate central portion and a plurality of spaced apertures adjacent the marginal portion, a griddle of greater area than said deflector and adapted to be supported by the inclined holder sides in superposed spaced relation to said deflector, the griddle being provided with a substantially central opening, whereby the heated air and gases are outwardly spread by said deflector to the marginal portions of said griddle and thereafter upwardly discharged through said griddle central opening and the griddle thereby uniformly heated.

2. In a cooking utensil, the combination of a griddle holder open at its lower portion and adapted to be positioned over a heating means, supporting means projecting from the inner face of said holder, a deflector adapted to be positioned on said supporting means, said deflector having an imperforate central portion and a plurality of spaced apertures adjacent the marginal portion thereof, supporting means projecting from the inner face of said holder and spaced above said first-mentioned supporting means, a griddle adapted to be positioned on said last-mentioned supporting means, said griddle being provided with a substantially central opening, whereby the heated air and gases are outwardly spread by said deflector to the marginal portions of said griddle and thereafter upwardly discharged through said griddle central opening and the griddle thereby uniformly heated.

3. In a cooking utensil, the combination of a griddle holder open at its lower portion and adapted to be positioned over a heating means, said holder being circular in cross-section and having its annular side downwardly and inwardly inclined, a circular deflector adapted to be supported within said holder adjacent the lower portion thereof and having an imperforate central portion and a plurality of spaced apertures adjacent the marginal portion, a circular griddle of greater diameter than said deflector and adapted to be supported within said holder above said deflector, said griddle being provided with a substantially central opening, whereby the heated air and gases are outwardly spread by said deflector to the marginal portions of said griddle and thereafter upwardly discharged through said griddle central opening and the griddle thereby uniformly heated.

4. In a cooking utensil, the combination of a griddle holder open at its lower portion and adapted to be positioned over a heating means, upper and lower spaced supporting shoulders inwardly projecting from the holder, a deflector adapted to be positioned upon the lower shoulder, said deflector having an imperforate central portion and a plurality of spaced apertures adjacent the marginal portion thereof, a griddle adapted to be positioned on the upper shoulder, the griddle being provided with a substantially central opening, whereby the heated air and gases are outwardly spread by said deflector to the marginal portions of said griddle and thereafter upwardly discharged through said griddle central opening and the griddle thereby uniformly heated.

5. In a cooking utensil, the combination of a griddle holder open at its lower portion and adapted to be positioned over a heating means, a deflector having an imperforate central portion and a plurality of spaced apertures adjacent the marginal portion thereof, means to support the deflector within the holder adjacent the lower portion thereof, an imperforate griddle having a substantially central opening, means to support the griddle within the holder adjacent the upper portion thereof in superposed spaced relation to the deflector, whereby the heated air and gases are outwardly spread by said deflector to the marginal portions of the griddle and thereafter upwardly discharged through said griddle central opening and the griddle thereby uniformly heated.

6. In a cooking utensil, the combination of a griddle holder open at its lower portion and adapted to be positioned over a heating means, a deflector having an imperforate central portion and a plurality of spaced apertures adjacent the marginal portion thereof, means to support the deflector within the holder adjacent the lower portion thereof, an imperforate griddle having a substantially central opening, means to support the griddle within the holder adjacent the upper portion thereof in superposed spaced relation to the deflector, whereby the heated air and gases are outwardly spread by said deflector to the marginal portions of the griddle and thereafter upwardly discharged through said griddle central opening and the griddle thereby uniformly heated, and an upwardly projecting flange provided both at the griddle margin and around said central opening to prevent griddle-greasing material from dropping within said holder.

7. In a cooking utensil, the combination of a griddle holder open at its lower portion and adapted to be positioned over a heating means, a deflector having an imperforate central portion and a plurality of spaced apertures adjacent the marginal portion thereof, means to support the deflector within the holder adjacent the lower portion thereof, an imperforate griddle having a substantially central opening, means to support the griddle within the holder adjacent the upper portion thereof in superposed spaced relation to the deflector, whereby the heated air and gases are outwardly spread by said deflector to the marginal portions of the griddle and thereafter upwardly discharged through said griddle central opening and the griddle thereby uniformly heated, and the under side of the deflector being shaped to deflect hot air and gases outwardly from the central portion thereof.

8. In a cooking utensil, the combination of a griddle holder open at its lower portion and adapted to be positioned over a heating means, a deflector having an imperforate central portion and a plurality of spaced apertures adjacent the marginal portion thereof, means to support the deflector within the holder adjacent the lower portion thereof, an imperforate griddle having a substantially central opening, means to support the griddle within the holder adjacent the upper portion thereof in superposed spaced relation to the deflector, whereby the heated air and gases are outwardly spread by said deflector to the marginal portions of the griddle and thereafter upwardly discharged through said griddle central opening and the griddle thereby uniformly heated, and thermal insulating means carried by the under face of said imperforate portion of the deflector and adapted to prevent excessive heating of said portion when positioned immediately over a flame.

9. In a cooking utensil, the combination of a griddle holder open at its lower portion and adapted to be positioned over a heating means, a deflector having an imperforate central portion and a plurality of spaced apertures adjacent the marginal portion thereof, means to support the deflector within the holder adjacent the lower portion thereof, an imperforate griddle having a substantially central opening, means to support the griddle within the holder adjacent the upper portion thereof in superposed spaced relation to the deflector, whereby the heated air and gases are outwardly spread by said deflector to the marginal portions of the griddle and thereafter upwardly discharged through said griddle central opening and the griddle thereby uniformly heated, and a member carried by the deflector and downwardly spaced from the under face thereof and adapted to prevent excessive heating of the central portion of the deflector when positioned immediately over a flame.

In witness whereof, I have hereunto set my hand this 13" day of February, 1922.

NELSON PETER LINN.